(12) United States Patent
Masuda et al.

(10) Patent No.: US 7,319,558 B2
(45) Date of Patent: Jan. 15, 2008

(54) WIDE-BAND WAVE PLATE AND A CONTROLLING METHOD THEREOF

(75) Inventors: Osamu Masuda, Machida (JP);
Kazumi Furuta, Akishima (JP);
Makiko Imae, Hino (JP)

(73) Assignee: Konica Minolta Holdings, Inc., Tokyo (JP)

( * ) Notice: Subject to any disclaimer, the term of this patent is extended or adjusted under 35 U.S.C. 154(b) by 0 days.

(21) Appl. No.: 11/360,947

(22) Filed: Feb. 23, 2006

(65) Prior Publication Data
US 2006/0193045 A1    Aug. 31, 2006

(30) Foreign Application Priority Data
Feb. 28, 2005   (JP)   ............... 2005-053027

(51) Int. Cl.
*G02B 5/30*    (2006.01)
(52) U.S. Cl. ............. 359/486; 359/497; 359/500
(58) Field of Classification Search .......... None
See application file for complete search history.

(56) References Cited

U.S. PATENT DOCUMENTS

2003/0156325 A1* 8/2003 Hoshi .................... 359/486

FOREIGN PATENT DOCUMENTS

| JP | 63-155107 A | 6/1988 |
|---|---|---|
| JP | 10-90521 A | 4/1998 |

* cited by examiner

*Primary Examiner*—Stephone B. Allen
*Assistant Examiner*—Lee Fineman
(74) *Attorney, Agent, or Firm*—Frishauf, Holtz, Goodman Chick, P.C.

(57) ABSTRACT

A wide-band wave plate having at least two wave plates, each of which has a microstructure to generate a phase difference, the microstructure having a cycle not shorter than $1/n_{min}$ of a shortest wavelength of light in use, wherein the two wave plates are arranged to face opposite with their main axes in non-parallel with each other, wherein $n_{min}$ is a refractive index of a wave plate material with respect to the shortest wavelength.

4 Claims, 5 Drawing Sheets

- TRANSMITTANCE (TE)
- TRANSMITTANCE (TM)

PRIOR ART

WIDE-BAND WAVE PLATE AND A CONTROLLING METHOD THEREOF

This application is based on Japanese Patent Application No. 2005-053027 filed with Japan Patent Office on Feb. 28, 2005, the entire content of which is hereby incorporated by reference.

BACKGROUND OF THE INVENTION

1. Field of the Technology

This invention relates to a wide-band wave plate made of multiple wave plate elements and a method of controlling the wide-band wave plate.

2. Description of the Related Art

Wave plates using the structured double refraction have been hard to be fabricated and reproduced because the structures are as large as their wavelengths and high aspect ratios are required to get generally-required phase differences ($\lambda/4$ and $\lambda/2$). Further, the structure of a wide-band property does not always have a high transmission efficiency at a structure height to get an optimum phase difference because the transmittance is dependent upon structure height.

In a conventional wave plate structure which combines two wave plates (A and B) with their main axes (a and b) matched together as shown in FIG. 5, an expected phase difference cannot be obtained if the wave plates (A and B) have production errors.

Patent Document 1 (shown below) discloses a polarization-axis-rotating laminated wave plate (retardation film) which laminates at least two wave plates of 60 to 300 nm (as the retardation value) with their slow axes set to a preset angle which is neither perpendicular nor parallel to each other. The invention of Patent Document 1 aims to make the wavelength range of the wave plate wider by shifting slow axes of the wave plates.

Patent Document 2 discloses a holographic optical element made of two relief-type gratings which are placed side by side at a predetermined relative angle between the grating grooves on the light axis. The phase difference of the optical element is controlled by adjusting the relative angle between the grating grooves of two relief-type gratings. However, this document does not consider any transmittance of optical elements.

Patent Document 1: Japanese Non-Examined Patent Publication H10-90521
Patent Document 2: Japanese Non-Examined Patent Publication 63-155107

SUMMARY OF THE INVENTION

In consideration of the above-described problems in the conventional technology, an object of this invention is to provide a high-transmittance wide-band wave plate whose phase difference can be controlled easily when the phase difference moves from a target value and a method of controlling the wide-band wave plate.

To attain the above object, one of modes of wide-band wave plates in accordance with this invention is characterized by using at least two wave plates which respectively have a microstructure whose cycle is at least $1/n_{min}$ of the shortest wavelength of light rays in use for phase difference and placing them face-to-face with their main axes in non-parallel.

wherein, $n_{min}$ is the refractive index of a wave plate material with respect to the shortest wavelength.

DETAILED DESCRIPTION OF THE PREFERRED EMBODIMENT

Figure 1:
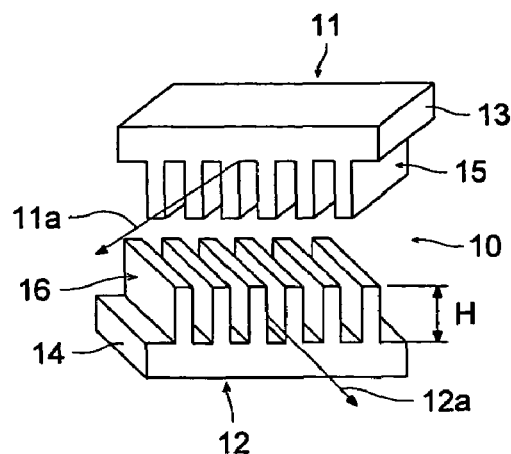
FIG. 1 is a schematic perspective view of a wide-band wave plate which is a preferred embodiment of this invention.

The above object can be attained also by the following structures:

1. A wide-band wave plate comprising at least two wave plates, each of which has a microstructure to generate a phase difference, the microstructure having a cycle not shorter than $1/n_{min}$ of a shortest wavelength of light in use, wherein the two wave plates are arranged to face opposite with their main axes in non-parallel with each other, where, $n_{min}$ is a refractive index of a wave plate material with respect to the shortest wavelength.

In accordance with this wide-band wave plate which produces a phase difference by a cyclic microstructure whose cycle is at least $1/n_{min}$ of the shortest wavelength of light in use, when its height is designed to get a high transmittance, it is possible to get a desired phase difference by placing at least two wave plates with their main axes in non-parallel even if the phase difference is shifted from a target value. Therefore, this mode can build up a high-transmittance simple wide-band wave plate of a desired phase difference.

2. The wide-band wave plate of structure 1, wherein $$0°<\delta1<135°,\ 0°<\delta2<135°,\ 90°<\delta1+\delta2<270°$$

where, $\delta1$ and $\delta2$ are phase differences of at least two wave plates.

3. At least one of the wave plates has structural dimensions, which satisfy Equation (1). With this, the resultant wave plate can have a high transmittance and a desired phase difference ($\lambda/4$).

$$H = a_1 \times f + b_1 + c_1 \tag{1}$$

where
$-d_1 \leq c_1 \leq +d_1$
$a_1 = -10 \times P + 4.6$
$b_1 = -18.560 \times P^2 + 27.684 \times P - 6.8299$ $d_1 = -27.273 \times P^2 + 18.994 \times P - 3.15$ P: Structure cycle (μm)

H: Structure height (μm)

f: Filling factor (=L/P where L is the width of the structure (μm))

4. At least one of the wave plates has structural dimensions, which satisfy Equation (2). With this, the resultant wave plate can have a high transmittance and a desired phase difference (λ/4).

$$H = a_2 \times f + b_2 + c_2 \qquad (2)$$

where $-d_2 \leqq c_2 \leqq +d_2$ $a_2 = -10 \times P + 4.6$ $b_2 = -76.515 \times P^2 + 69.335 \times P - 13.825$ $d_2 = -54.631 \times P^2 + 36.782 \times P - 6.02$ P: Structure cycle (μm)

H: Structure height (μm)

f: Filling factor (=L/P where L is the width of the structure (μm))

5. A method of controlling a wide-band wave plate to get a desired phase difference and polarization state by combining at least two wave plates face-to-face each of which has a cyclic microstructure to produce a phase difference and controlling shift angles of main axes of the wave plates according to the polarization dependence of their phase differences and transmittance Although a wave plate made of a single wave plate element or two wave plate elements (whose main axes are in parallel with each other) cannot assure the target phase difference if respective wave plate elements have a processing error, a wave plate made of at least two wave plate elements which are placed face-to-face with their main axes intersected can have a desired phase difference by controlling shift angles of main axes of the wave plates according to the polarization dependence of their phase differences and transmittance. For example, a λ/4 wave plate can transform linear polarization into perfect circular polarization and a λ/2 wave plate can transform linear polarization into intersecting linear polarization.

In a double refraction element like a wave plate, a direction along which light propagates faster (or the phase advances) is called a fast axis of the element. Similarly, a direction along which light propagates slower (or the phase delays) is called a slow axis. Both the fast and slow axes are generically called main axes.

Figure 2:
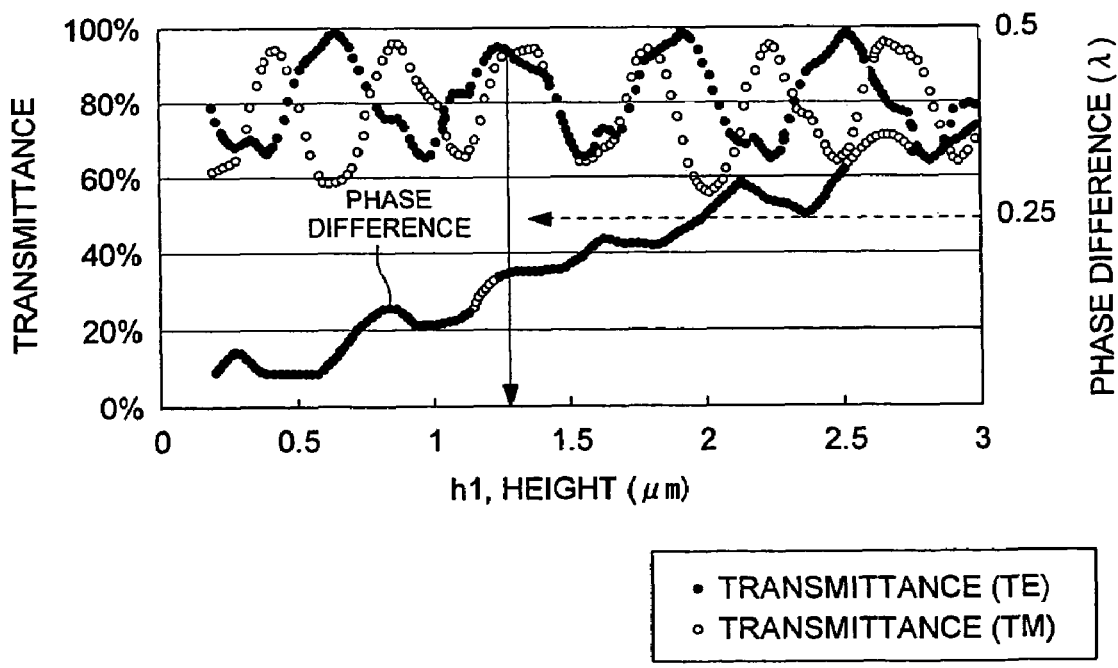
FIG. 2 is a graph showing a relationship of structure height, transmittance, and phase difference (at wavelength of $\lambda$=405 nm) of a single wave plate element.
Figure 3:
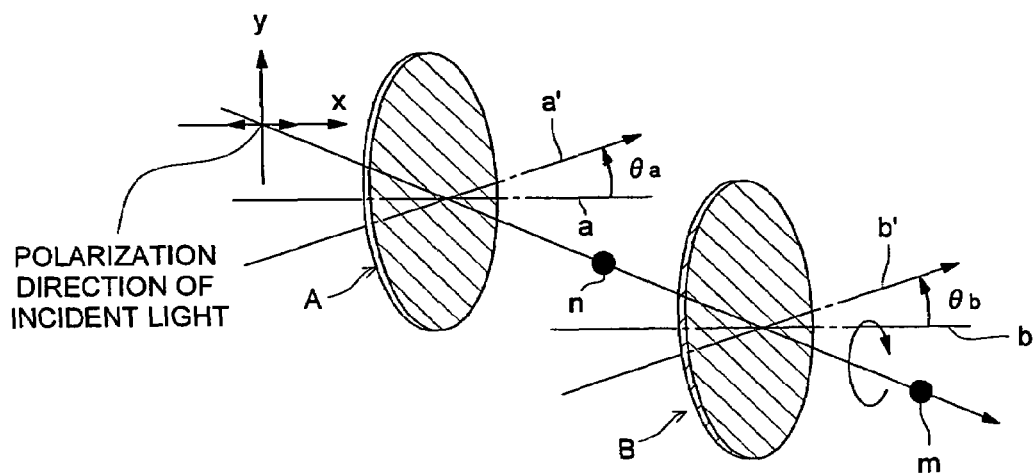
FIG. 3 is a schematic drawing to explain the deviation angle (direction of deviation) of the main axis of each wave plate element which constitutes the wide-band wave plate of FIG. 1.

The best modes of this invention will be described below in reference with the accompanying drawings. FIG. 1 shows a schematic perspective view of a wide-band wave plate which is a preferred embodiment of this invention. FIG. 2 graphically shows the relationship of structure height, transmittance, and phase difference (wavelength λ=405 nm) of a single wave plate element. FIG. 3 is a drawing to explain shift angles (direction of deviation) of main axes of wide-band wave plate elements (FIG. 1).

Figure 4:
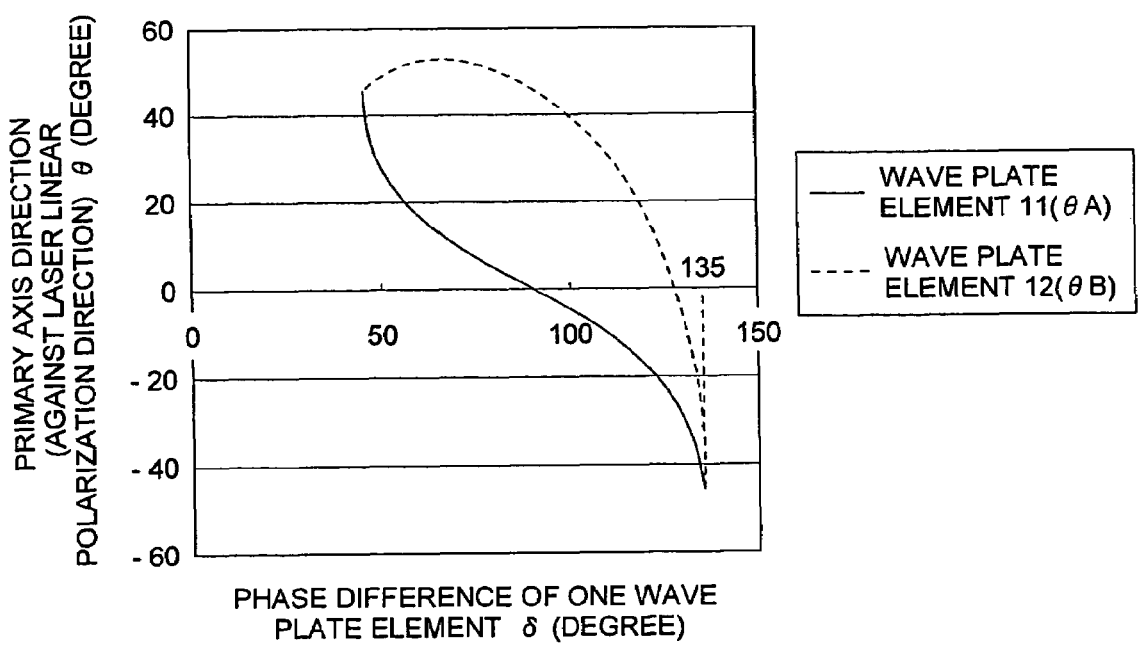
FIG. 4 is a graph to explain the disposition of wave plate elements of the wide-band wave plate to get ¼ wavelengths.
Figure 6:
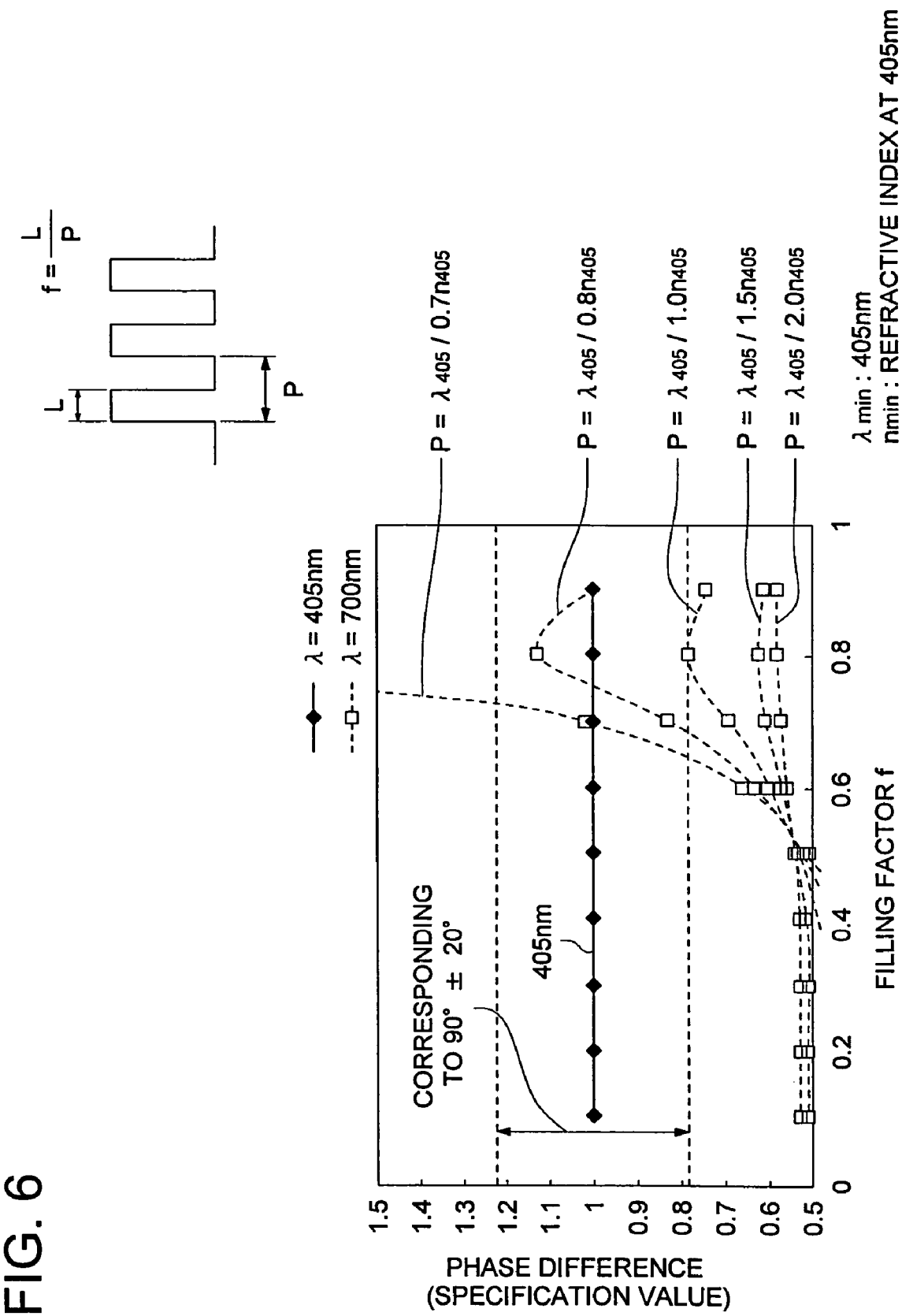
FIG. 6 graphically shows the relationship of filing factor and normalized phase difference of a wave plate element at a wavelength of 405 nm.

FIG. 4 is a graph to explain the disposition of wide-band wave plate elements (FIG. 1) to get a λ/4 wave plate. FIG. 6 graphically shows the relationship of filing factor and phase difference of a wave plate element normalized at a wavelength of 405 nm.

As shown in FIG. 1, wide-band wave plate 10 comprises first wave plate element 11 having cyclic concavo-convex microstructure 15 on back plate 13 and second wave plate element 12 having cyclic concavo-convex microstructure 16 on back plate 14. First and second wave plate elements 11 and 12 are placed face to face with their faces parallel to each other but their main axes 11a and 12a are not parallel to each other.

Cyclic concavo-convex structures 15 and 16 of first and second wave plate elements 11 and 12 are the same in designing and property.

FIG. 2 shows the relationship between height H (see FIG. 1) of the cyclic concavo-convex structure and transmittance (TE and TM) and the relationship between structure height H and phase difference. As seen from the dashed line in FIG. 2, a desired phase difference (λ/4) can be obtained at a structure height (H) of 2 μm but the transmittance is low. When a wide-band wave plate is made of a single wave plate element to have a wider wave band property, the transmittance dependents upon the structure height. Therefore, a high transmittance efficiency is not always obtained at a structure height for a target phase difference (λ/4).

The cyclic concavo-convex structures of FIG. 6 (where P, L, and f are the pitch (cycle), width, and filling factor (L/P) of the structure in this order) are used to compare phase differences of wavelengths 405 nm and 700 nm assuming that wavelengths 650 nm and 780 nm are approximately equal to the wavelength of 700 nm. When a general wide-band property is assumed to be within ±20°, it is known that $\lambda_{min}/n < P$ (where "n" is a refractive index) is available as the design value. Although the above calculation uses a polyolefin resin as the optical resin material, any general-purpose optical resin material can be used without making a difference.

The structure height H of a wave plate which is made of a general optical resin material must be at least 2 μm to get a phase difference of λ/4 and is hard to be produced. Such a wave plate can be easily produced by laminating two wave plate elements as already explained. Further since the transmittance of short wavelengths greatly varies in this region as shown in FIG. 2, a desired phase difference (for example, one-second, one-third, and so on of λ/4 or λ/2) cannot be obtained at a high transmittance. It is necessary to control the alignment (angle) of main axes of the wave plate elements to get a desired phase difference at a high transmittance.

When each of wave plate elements 11 and 12 in FIG. 1 has a cyclic concavo-convex structure of, for example, FIG. 2, a desired phase difference (λ/4) can be obtained by designing the structure height (H) so that the transmittance may be high (i.e. H is approx. 1.3 μm) as indicated by the solid line, laminating first and second wave plate elements 11 and 12 and controlling the shift angles of their main axes 11a and 12a so that they may not be in parallel with each other as shown in FIG. 1.

In this case, main axis "a" of first wave plate element A and main axis "b" of second wave plate element B before adjustment are aligned in parallel to the polarization direction of the incident light along With, for example, the x-axis. The main axes are made non-parallel by controlling to move the main axis "a" of first wave plate element A (before adjustment) by θa (where the resulting main axis is "a'") and the main axis "b" of second wave plate element B (before adjustment) by θb (where the resulting main axis is "b'"). A desired phase difference (λ/4) can be obtained by controlling these shift angles θa and θb.

For example, when firsthand second wave plate elements 11 and 12 of the same designing and property are laminated as shown in FIG. 1, a wave plate of ¼ wavelength can be obtained by controlling the shift angles θa and θb of first and second wave plate elements 11 and 12 as shown in FIG. 4. In other words, when wave plate elements 11 and 12 whose phase differences δ1 and δ2 are, for example, 100° and respectively satisfy conditional equations (3), (4), and (5), wide-band wave plate 10 of FIG. 1 can work as a λ/4 wave plate by shifting θa of main axis 11a by about −5° and θb of main axis 12a by about 40° (see FIG. 4).

$$0° < \delta1 < 135° \quad (3)$$

$$0° < \delta2 < 135° \quad (4)$$

$$90° < \delta1 + \delta2 < 270° \quad (5)$$

Conventionally, wave plates using the structured double refraction have been hard to be fabricated and reproduced because the structures are as large as their wavelengths and high aspect ratios are required to get generally-required phase differences (λ/4 and λ/2). Further, the structure of a wide-band property does not always have a high transmission efficiency at a structure height to get an optimum phase difference. Meanwhile, the wide-band wave plate of this embodiment comprises two wave plate elements, each of which is designed to have a structure height to get a high transmittance. Although the wide-band wave plate 10 is simple as shown in FIG. 1, it can get a desired phase difference by adjusting the wave plate elements to the desired phase difference even when the phase difference moves from the target phase difference.

Figure 5:
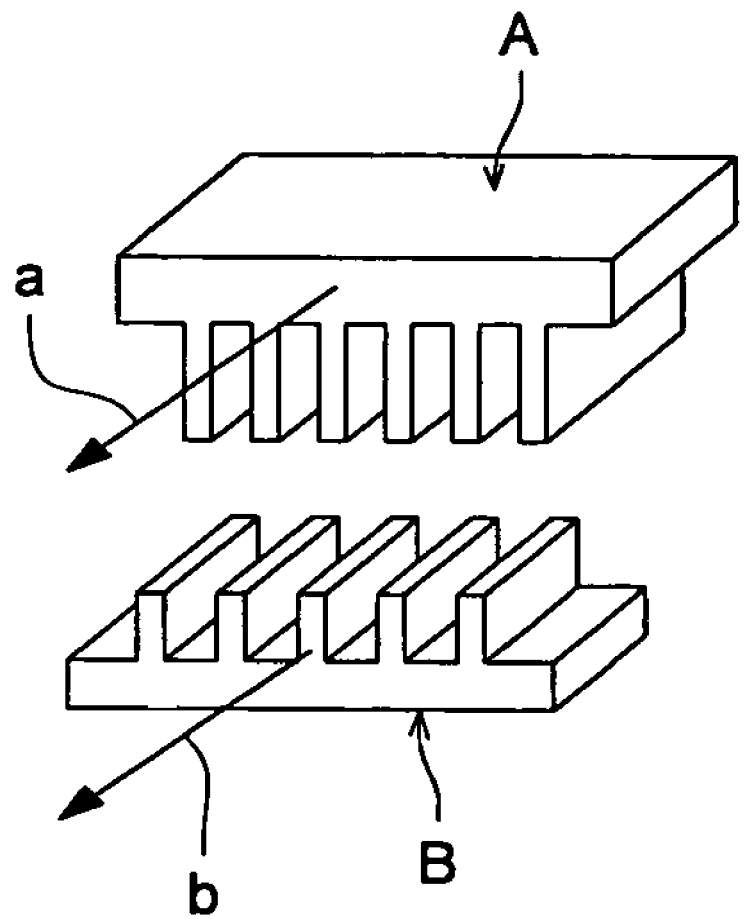
FIG. 5 shows a schematic perspective view of a conventional 2-element wave plate.

Further, when each wave plate element has a processing error, the phase difference of a wave plate comprising a single wave plate element or two wave plate elements (whose main axes are in parallel with each other as shown in FIG. 5) cannot assure the target phase difference if each wave plate element has a processing error. Even in such a case, it is easy to adjust the phase difference to a target phase difference by moving the main axes of the elements as shown in FIG. 3. In this way, the wave plate controlling method of this embodiment can adjust to a designed phase difference by moving the man axes of the elements even when the elements have processing errors.

Although the wave plate of Patent Document 1 aims to make the wavelength band wider by moving the slow axes of each wave plate element, the wide-band wave plate of this invention gives a wide-band property to its structure and controls the phase difference by moving the main axes of its elements.

Below will be explained how the preferred embodiment of this invention gets a designed phase difference by moving the shift angles of main axes of two combined wave plate elements in consideration of the polarization dependence of transmittance.

The ¼ wave plate whose main axis is at 45° to the direction of polarization of incident light which has a linear polarization basically functions to transform the linear polarization into a circular polarization or vice versa (transforming incident light of circular polarization into linear polarization). However, if the polarization components have different transmittances, the ¼ wave plate cannot assure transformation to a perfect circular polarization even when the main axis is positioned at 45° to the direction of polarization of the incident light. The resulting polarization may be elliptic. Therefore, this wave plate is not preferable to general optical equipment.

Particularly, the wave plate using a structured double refraction has different transmittance deviations for incident light (TE wave) which has a polarization direction parallel to the microstructure and the incident light (TM wave) which has a polarization direction perpendicular to the microstructure according to its shape parameters (such as height, pitch, and filling factor). Therefore, transmittances of TE and TM waves are not always identical even when the designed values are considered to be preferable according to the wide-band property and the average transmittance of TE and TM waves. It is therefore necessary to adjust the angle of main axes considering both the phase difference and the polarization dependence of transmittance when combining two wave plate elements face-to-face.

Next will be explained a method of calculating the shift angles of main axes of two wave plate elements which are combined face-to-face. When a polarization-dependent component of the wave plate is treated separately from a phase-difference producing component of the wave plate, they can be expressed with a partial polarizer matrix (PO) and a phaser matrix (C) by using a Stokes' parameter transform matrix. (See "Applied Optics I and II" (written by Dr. Kunio Turuta and published by Baihu-kan).)

Partial polarizer matrixes ($PO_A$ and $PO_B$) and phaser matrixes ($C_A$ and $C_B$) of the wave plate elements (A and B) of FIG. 3 are respectively expressed by Equations (6), (7), (8), and (9) of Formula 1. Stokes' parameter S' for outgoing light is related with Stokes' parameter S for incident light by Equation 11 or Equation 10 (without considering the polarization dependence) using partial polarizer matrixes ($PO_A$ and $PO_B$) and phaser matrixes ($C_A$ and $C_B$).

[Formula 1]

$$C_A = \begin{pmatrix} 1 & 0 & 0 & 0 \\ 0 & 1-(1-\cos\delta_1)\sin^2 2\theta_a & (1-\cos\delta_1)\sin 2\theta_a \cos 2\theta_a & -\sin\delta_1 \sin 2\theta_a \\ 0 & (1-\cos\delta_1)\sin 2\theta_a \cos 2\theta_a & 1-(1-\cos\delta_1)\cos^2 2\theta_a & \sin\delta_1 \cos 2\theta_a \\ 0 & \sin\delta_1 \sin 2\theta_a & -\sin\delta_1 \cos 2\theta_a & \cos\delta_1 \end{pmatrix} \quad (6)$$

$$PO_A = 1/2 \begin{pmatrix} TM_A^2 + TE_A^2 & TM_A^2 - TE_A^2 & 0 & 0 \\ TM_A^2 - TE_A^2 & TM_A^2 + TE_A^2 & 0 & 0 \\ 0 & 0 & 2 \cdot TM_A \cdot TE_A & 0 \\ 0 & 0 & 0 & 2 \cdot TM_A \cdot TE_A \end{pmatrix} \quad (7)$$

-continued $$C_B = \begin{pmatrix} 1 & 0 & 0 & 0 \\ 0 & 1-(1-\cos\delta_2)\sin^2 2\theta_b & (1-\cos\delta_2)\sin 2\theta_b\cos 2\theta_b & -\sin\delta_2\sin 2\theta_b \\ 0 & (1-\cos\delta_2)\sin 2\theta_b\cos 2\theta_b & 1-(1-\cos\delta_2)\cos^2 2\theta_b & \sin\delta_2\cos 2\theta_b \\ 0 & \sin\delta_2\sin 2\theta_b & -\sin\delta_2\cos 2\theta_b & \cos\delta_2 \end{pmatrix} \quad (8)$$

$$PO_B = 1/2 \begin{pmatrix} TM_B^2 + TE_B^2 & TM_B^2 - TE_B^2 & 0 & 0 \\ TM_B^2 - TE_B^2 & TM_B^2 + TE_B^2 & 0 & 0 \\ 0 & 0 & 2 \cdot TM_B \cdot TE_B & 0 \\ 0 & 0 & 0 & 2 \cdot TM_B \cdot TE_B \end{pmatrix} \quad (9)$$

where
C: Phaser matrix
PO: Partial polarizer matrix
δ: Phase difference
θ: Direction of main axis
$TE_A$: TE transmittance of wave plate A
$TM_A$: TM transmittance of wave plate A
$TE_B$: TE transmittance of wave plate B
$TM_B$: TM transmittance of wave plate B $$S' = C_B \cdot C_A \cdot S \quad (10)$$

$$S' = C_B \cdot PO_B \cdot C_A \cdot PO_A \cdot S \quad (11)$$

$$K \cdot \begin{pmatrix} s'_0 \\ s'_1 \\ s'_2 \\ s'_3 \end{pmatrix} = C_B \cdot PO_B \cdot C_A \cdot PO_A \cdot \begin{pmatrix} s_0 \\ s_1 \\ s_2 \\ s_3 \end{pmatrix} \quad (11')$$

K: Coefficient

Stokes' parameter S for a linear polarization of 0 degree is expressed by Formula 2.

[Formula 2]
$$S = \begin{pmatrix} s_0 \\ s_1 \\ s_2 \\ s_3 \end{pmatrix} = \begin{pmatrix} 1 \\ 1 \\ 0 \\ 0 \end{pmatrix}$$

Stokes' parameters S' for clockwise circular polarization and counterclockwise circular polarization are respectively expressed by equations in Formula 3.

[Formula 3]
$$S' = \begin{pmatrix} s'_0 \\ s'_1 \\ s'_2 \\ s'_3 \end{pmatrix} = \begin{pmatrix} 1 \\ 0 \\ 0 \\ 1 \end{pmatrix} \quad S' = \begin{pmatrix} s'_0 \\ s'_1 \\ s'_2 \\ s'_3 \end{pmatrix} = \begin{pmatrix} 1 \\ 0 \\ 0 \\ -1 \end{pmatrix}$$

Adequate angles for wave plate elements A and B are δ1 and δ2 which respectively satisfy Equations (12) and (12') in Formula 4.

[Formula 4]
$$K \cdot \begin{pmatrix} 1 \\ 0 \\ 0 \\ 1 \end{pmatrix} = C_A \cdot PO_B \cdot C_A \cdot PO_A \cdot \begin{pmatrix} 1 \\ 1 \\ 0 \\ 0 \end{pmatrix} \quad (12)$$

$$K \cdot \begin{pmatrix} 1 \\ 0 \\ 0 \\ -1 \end{pmatrix} = C_B \cdot PO_B \cdot C_A \cdot PO_A \quad (12')$$

K: Coefficient

As explained above, the wave plate of this embodiment can get a desired phase difference by adjusting the shift angles of wave plate elements A and B to the above adequate angles. Further, even when the polarization components have different transmittances, the wave plate can transform incident light of linear polarization of light into outgoing light of perfect circular polarization (not elliptic polarization) through wave plate elements A and B. Therefore, this wide-band wave plate is fully applicable to general optical equipment.

EMBODIMENTS

The details of this invention will be described below using Embodiments 1 and 2, but the embodiments of this invention are not intended as a definition of the limits of the invention.

Embodiment 1

The structural dimensions (pitch P, structure height H, and filling factor f(=L/P where L is a structure width)) of a 2-element wave plate of Embodiment 1 are determined by above Equations (1) and (2) as listed in Table 1 (see "Design 1 to Design 6). The transmittance and phase difference of the wave plate are evaluated and the result is listed also in Table 1. Rigorous Coupled Wave Analysis is used for vector analysis simulation. The wave plate elements are made of polyolefin resin and have the following refractive indexes (n).

$n=1.551088 (\lambda=405$ nm$)$ $n=1.533454 (\lambda=650$ nm$)$ $n=1.530011 (\lambda=780$ nm$)$

TABLE 1

|  | Equation (1)[*1] | Equation (2)[*1] | Dimensions | | | Shift angle[*2] Element 1 | Shift angle[*2] Element 2 | Transmittance (%) | | | Phase difference (deg) | | | Evaluation[*3] | | | Overall |
|  |  |  | P (μm) | f | H (μm) | (deg) | (deg) | $T_{405}$ | $T_{650}$ | $T_{780}$ | $\phi_{405}$ | $\phi_{650}$ | $\phi_{780}$ | (1) | (2) | (3) | evaluation |
|---|---|---|---|---|---|---|---|---|---|---|---|---|---|---|---|---|---|
| Design 1 | B | D | 0.33 | 0.72 | 1.24 | 19.9 | 52.4 | 90.56% | 94.38% | 95.51% | 0.2500 | 0.2370 | 0.2116 | B | B | B | B |
| Design 2 | B | D | 0.39 | 0.63 | 1.58 | 7.7 | 53.1 | 77.36% | 95.21% | 95.70% | 0.2500 | 0.2519 | 0.2270 | B | B | B | B |
| Design 3 | D | B | 0.31 | 0.75 | 1.42 | 17.5 | 55.3 | 77.99% | 92.97% | 92.64% | 0.2500 | 0.2402 | 0.2114 | B | B | B | B |
| Design 4 | D | B | 0.37 | 0.63 | 1.86 | 0.3 | 47.3 | 78.48% | 95.36% | 94.84% | 0.2500 | 0.2561 | 0.2303 | B | B | B | B |
| Design 5 | D | D | 0.32 | 0.63 | 1.16 | 6.5 | 49 | 78.58% | 94.78% | 93.11% | 0.2500 | 0.1962 | 0.1675 | B | C | C | C |
| Design 6 | D | D | 0.38 | 0.72 | 1.44 | 14.5 | 41.8 | 62.44% | 93.53% | 92.98% | 0.2500 | 0.2441 | 0.2213 | C | B | B | C |

[*1]B: Satisfies the condition.
[*2]D: Does not satisfy the condition.
[*3]The angle of incidence of light is 0 degree.
Evaluation criteria
(1) Transmittance of 75% or more
(2) Phase difference $\phi_{650}$ = 0.25 ± 0.02 (λ) or less at λ = 650 nm when the element is adjusted to $\phi_{405}$ = 0.25 (λ) at λ = 405 nm
(3) Phase difference $\phi_{780}$ = 0.25 ± 0.04 (λ) or less at λ = 780 nm when the element is adjusted to $\phi_{405}$ = 0.25 (λ) at λ = 405 nm
B: Satisfies each of the above conditions.
In "Overall evaluation":
B: Satisfies all of the above conditions (1), (2), (3).

(1) Equations
$$\begin{cases} H = a_1 \times f + b_1 + c_1; -d_1 \leq c_1 \leq +d_1 \\ a_1 = -10 \times P + 4.6 \\ b_1 = -18.560 \times P^2 + 27.684 \times P - 6.8299 \\ d_1 = -27.273 \times P^2 + 18.994 \times P - 3.15 \end{cases}$$

(2) Equations
$$\begin{cases} H = a_2 \times f + b_2 + c_2; -d_2 \leq c_2 \leq +d_2 \\ a_2 = -10 \times P + 4.6 \\ b_2 = -76.515 \times P^2 + 69.335 \times P - 13.825 \\ d_2 = -54.631 \times P^2 + 36.782 \times P - 6.02 \end{cases}$$

(P: Structure cycle (μm), f: Filling factor, H: Structure height (μm))

In Table 1, the overall evaluation (*3) was made as follows:
(1) Transmittance of 75% or more
(2) Phase difference $\phi_{650}$=0.25±0.02 (λ) or less at λ=650 nm when the element is adjusted to $\phi_{405}$=0.25(λ) at λ=405 nm
(3) Phase difference $\phi_{780}$=0.25±0.04 (λ) or less at λ=780 nm when the element is adjusted to $\phi_{405}$=0.25(λ) at λ=405 nm
B: Satisfies each of the above conditions.
C: Does not satisfy each of the above conditions.

In "Overall evaluation" B: Satisfies all of the above conditions (1), (2), and (3).

Judging from Table 1, it is apparent that a wide-band wave plate of high transmittance and phase difference of λ/4 can be obtained by satisfying Equation (1) or (2) and determining adequate angles for main axes of the two wave plate elements.

Embodiment 2

Figure 7:
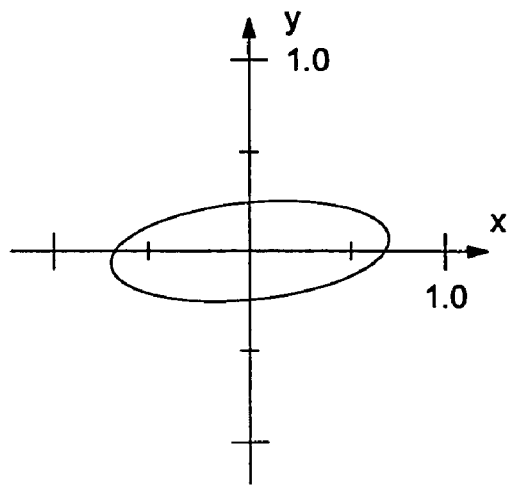
FIG. 7(a) shows the polarization state at point "n" (in FIG. 3) when the angle is controlled without considering the polarization dependence. Similarly.
FIG. 7(b) shows the polarization state at point "m" (in FIG. 3).
Figure 7:
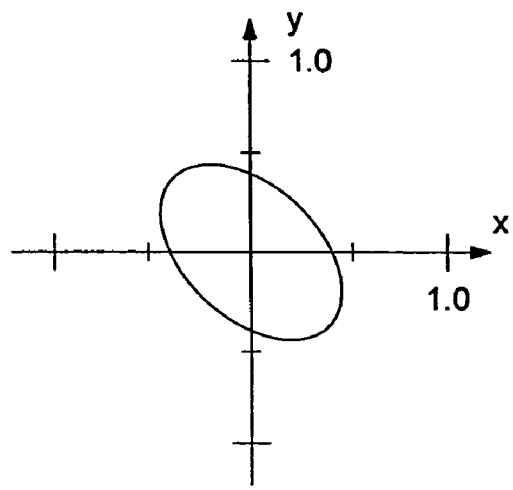
Figure 8:
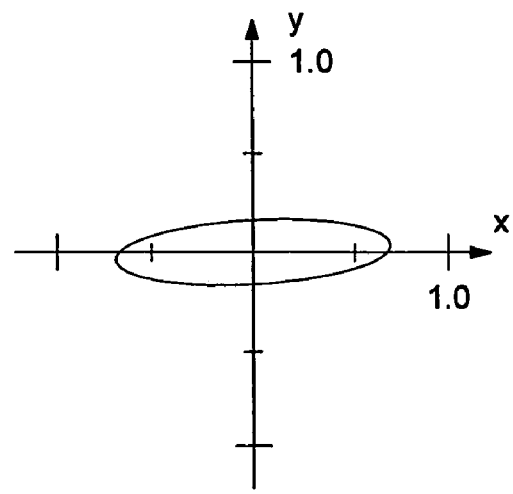
FIG. 8(a) shows the polarization state at point "n" (in FIG. 3) when the angle is controlled considering the polarization dependence. Similarly.
FIG. 8(b) shows the polarization state at point "m" (in FIG. 3).
Figure 8:
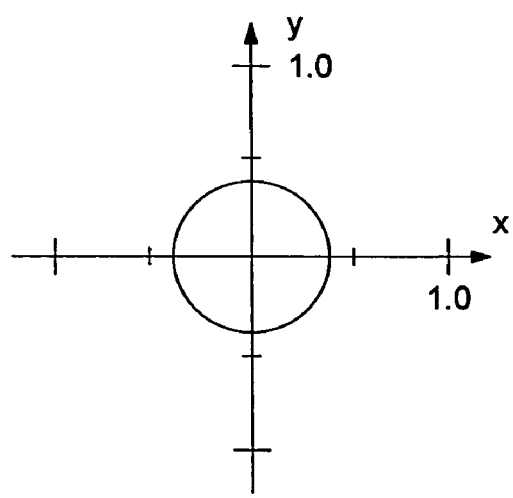

Embodiment 2 is a method of controlling shift angles of main axes of two wave plate elements in consideration of polarization dependence of transmittance when combining the elements. FIG. 7(a) shows the polarization state at point "n" (in FIG. 3) when the angle is controlled without. considering the polarization dependence. Similarly, FIG. 7(b) shows the polarization state at point "m" (in FIG. 3). FIG. 8(a) shows the polarization state at point "n" (in FIG. 3) when the angle is controlled considering the polarization dependence. Similarly, FIG. 8(b) shows the polarization state at point "m" (in FIG. 3).

This embodiment uses the following two wave plate elements to laminate:
Wave plate element A: Phase difference of 65 deg, TE transmittance of 100%, and TM transmittance of 50%
Wave plate element B: Phase difference of 60 deg, TE transmittance of 100%, and TM transmittance of 50%

Without consideration of polarization dependence, δ1 and δ2 which are solutions of Equation (10) for angle adjustment are 16.7 deg and 53.9 deg. The polarization states are shown in FIGS. 7(a) and 8(b). Meanwhile in consideration of polarization dependence, δ1 and δ2 which are solutions of Equation (11) for angle adjustment are 11.2 deg and 37.9 deg. The polarization states are shown in FIGS. 8(a) and 8(b).

In case of angle adjustment without consideration of polarization dependence, the obtained polarization is not a perfect circular polarization as shown in FIG. 7(b). It is an elliptic polarization. Contrarily, in case of angle adjustment in consideration of polarization dependence, the obtained polarization is a perfect circular polarization as shown in FIG. 8(b).

Although the present invention has been fully described in connection with the best mode and the embodiments, it is to be noted that various changes and modifications are apparent to those skilled in the art. For example, although wave plate elements 11 and 12 are laminated together with their cyclic concavo-convex surfaces in contact, the cyclic concavo-convex surface can be faced to back plate surface 13 or 14 in lamination or wave plate elements 11 and 12 are laminated together with their back plate surfaces 13 and 14 in contact. Further, light can be incident to any surface of the wave plate element (cyclic concavo-convex surface or back plate surface) and to any wave plate element (first or second wave plate element 11 or 12).

Furthermore, although the wave plate of FIG. 1 laminates two wave plate elements of the same designing and configuration, the wave plate element of this invention is not limited to this. It is possible to laminate three or more wave plate elements or wave plate elements of cyclic concavo-convex microstructures of different properties.

This invention can provide a high-transmittance wide-band wave plate whose phase difference can be controlled easily. The method of controlling the wide-band wave plate in accordance with this invention can easily set a target phase difference even when the phase difference moves away from the value.

What is claimed is:

1. A wide-band wave plate comprising at least two wave plates, each of which has a microstructure to generate a phase difference, each microstructure of the two wave plates having a cycle not shorter than $1/n_{min}$ of a shortest wavelength of light in use, wherein the two wave plates are arranged so that microstructures of the two wave plates are disposed face to face with each other with main axes of the microstructures being non-parallel with each other, where, $n_{min}$ is a refractive index of a wave plate material of which at least one of the two wave plate are made with respect to the shortest wavelength of light in use, wherein $0°<\delta1<135°$, $0°<\delta2<135°$, $90°<\delta1+\delta2<270°$, where, $\delta1$ and $\delta2$ are respectively phase differences of the two wave plates.

2. The wide-band wave plate of claim 1, wherein at least one of the two wave plates has structural dimensions which satisfy a relation of: $H=a_1 \times f + b_1 + c_1$, where, $-d_1 \geq c_1 \geq +d_1$
$a_1 = -10 \times P + 4.6$
$b_1 = -18.560 \times P^2 + 27.684 \times P - 6.8299$
$d_1 = -27.273 \times P^2 + 18.994 \times P - 3.15$
P: structure cycle (μm)
H: structure height (μm)
f: filling factor=L/P, where L is the width of the structure (μm).

3. The wide-band wave plate of claim 1, wherein at least one of the two wave plates has structural dimensions which satisfy a relation of: $H=a_2 \times f + b_2 + c_2$, where,
$-d_2 \leq c_2 \leq +d_2$
$a_2 = -10 \times P + 4.6$
$b_2 = -76.515 \times P^2 + 69.335 \times P - 13.825$
$d_2 = -54.631 \times P^2 + 36.782 \times P - 6.02$
P: structure cycle (μm)
H: structure height (μm)
f: filling factor=L/P, where L is the width of the structure (μm).

4. A wide-band wave plate comprising at least two wave plates, each of which has a microstructure to generate a phase difference, each microstructure of the two wave plates having a cycle not shorter than $1/n_{min}$ of a shortest wavelength of light in use, wherein the two wave plates are arranged so that microstructures of the two wave plates are disposed face to face with each other with main axes of the microstructures being non-parallel with each other, where, $n_{min}$ is a refractive index of a wave plate material of which at least one of the two wave plate are made with respect to the shortest wavelength of light in use, wherein at least one of the two wave plates has structural dimensions which satisfy a relation of:

$H=a_2 \times f + b_2 + c_2$, where,
$-d_2 \geq c_2 \geq +d_2$
$a_2 = -10 \times P + 4.6$
$b_2 = -76.515 \times P^2 + 69.335 \times P - 13.825$
P: structure cycle (μm)
H: structure height (μm)
f: filling factor=L/P, where L is the width of the structure (μm).

* * * * *